United States Patent [19]

White et al.

[11] 4,431,779

[45] Feb. 14, 1984

[54] POLYETHERIMIDE-POLYPHENYLENE ETHER BLENDS

[75] Inventors: Dwain M. White, Schenectady; Robert O. Matthews, Voorheesville, both of N.Y.

[73] Assignee: General Electric Company, Pittsfield, Mass.

[21] Appl. No.: 364,903

[22] Filed: Apr. 2, 1982

[51] Int. Cl.³ .................. C08L 71/04; C08L 79/08
[52] U.S. Cl. ................................. 525/397; 525/905
[58] Field of Search ............................ 525/397, 905

[56] References Cited

U.S. PATENT DOCUMENTS 3,416,994  12/1968  Chalmers ........................... 525/397
4,293,670  10/1981  Robeson ............................ 525/928
4,315,086   2/1982  Ueno ................................ 525/397
4,338,421   7/1982  Markyama ......................... 525/397
4,340,697   7/1982  Aya .................................. 525/928

FOREIGN PATENT DOCUMENTS 55-102650  8/1980  Japan .................................. 525/397

Primary Examiner—Paul Lieberman
Attorney, Agent, or Firm—Bernard, Rothwell & Brown

[57] ABSTRACT

Disclosed are blends of (a) a polyetherimide and (b) a polyphenylene ether. The components of the blend are generally compatible and the blends exhibit good impact strength as well as good mechanical properties. The blends are suitable for forming insulative films on substrates and for the manufacture of filaments, fibers, coatings, molded articles and the like.

8 Claims, No Drawings

POLYETHERIMIDE-POLYPHENYLENE ETHER BLENDS

This invention relates to a class of polyetherimide-polyphenylene ether blends. The components of the blend are generally compatible and the blends have good impact strength as well as good mechanical properties The blends of the invention include a polyetherimide of the formula:

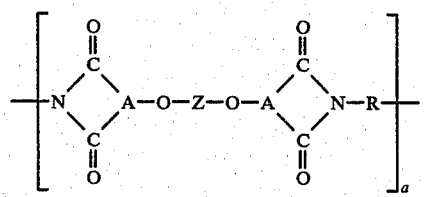

where a represents a whole number in excess of 1, e.g., 10 to 10,000 or more, the group —O—A< is selected from:

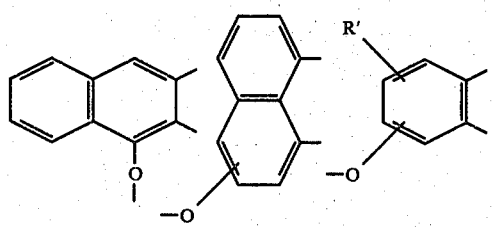

R' being hydrogen, lower alkyl or lower alkoxy, preferably the polyetherimide includes the latter —O—A< group where R' is hydrogen such that the polyetherimide is of the formula:

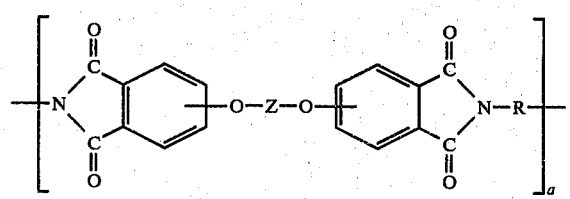

and the divalent bonds of the —O—Z—O radical are in the 3,3'; 3,4'; 4,3' or the 4,4' position. Z is a member of the class consisting of

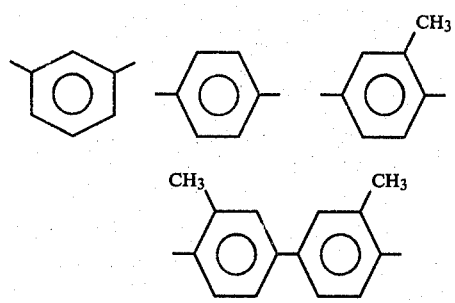

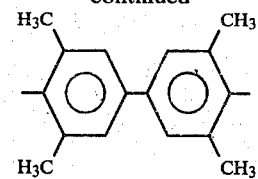

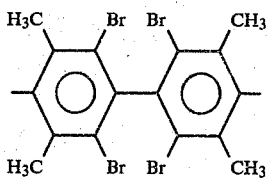

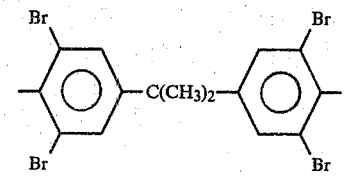

and (2) divalent organic radicals of the general formula:

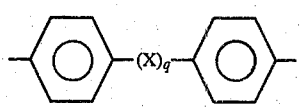

where X is a member selected from the class consisting of divalent radicals of the formulas,

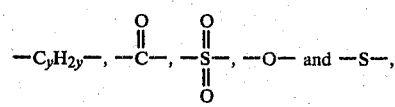

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

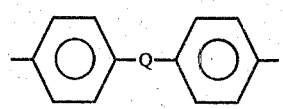

where Q is a member selected from the class consisting

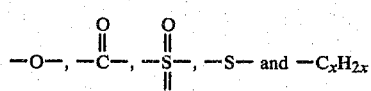

where x is a whole number from 1 to 5 inclusive. Particularly preferred polyetherimides for the purposes of the present invention include those where —O—A< and Z respectively are:

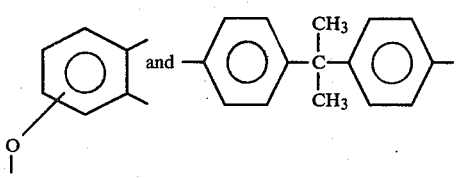 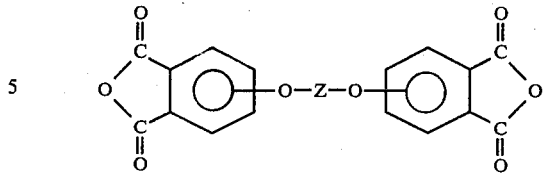

and R is selected from:

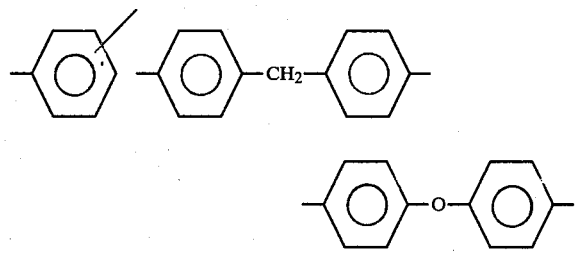

The polyetherimides where R is metaphenylene are most preferred.

The blends of the invention also include a polyphenylene ether which has the repeating structural units of the formula:

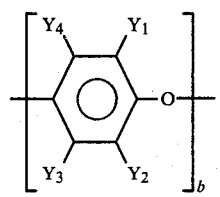

where the oxygen ether atom of one structural unit is connected to the benzene nucleus of the next adjoining unit, b is a positive integer and is at least 50, generally at least 100, and $Y_1$, $Y_2$, $Y_3$ and $Y_4$, which may be the same or different, are monovalent substitutents selected from the group consisting of hydrogen, halogen, hydrocarbon radicals, halohydrocarbon radicals having at least two carbon atoms between the halogen atom and the benzene nucleus, hydrocarboxy radicals and halohydrocarboxy radicals having at least two carbon atoms between the halogen atom and the benzene nucleus. Suitable hydrocarbon radicals include alkyl of one to ten carbon atoms and aryl of six to twenty carbons atoms. Preferred polyphenylene ethers for the purposes of the present invention include those where $Y_1$ and $Y_2$ are selected from alkyl of one to four carbon atoms and phenyl and $Y_3$ and $Y_4$ are hydrogen. Particularly preferred polyphenylene ethers for the purposes of the present invention are poly(2,6-dimethyl-1,4-phenylene)ether, i.e., $Y_1$ and $Y_2$ are methyl, poly(2,6-diphenyl-1,4 phenylene)ether, i.e., $Y_1$ and $Y_2$ are phenyl, and poly(2-methyl-6-phenyl-1,4-phenylene)ether, i.e., $Y_1$ is methyl and $Y_2$ is phenyl. Other suitable polyphenylene ethers include poly(2-benzyl-6-methyl-4 phenylene)ether and poly(2,6-dibenzyl-1,4 phenylene)ether.

The polyetherimides can be obtained by any of the methods well known to those skilled in the art including the reaction of any aromatic bis(ether anhydrides) of the formula where Z is as defined hereinbefore with an organic diamine of the formula $$H_2N-R-NH_2$$

where R is as defined hereinbefore.

Aromatic bis(ether anhydride)s of the above formula include, for example, 2,2-bis[4-(2,3-dicarboxyphenoxy)phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benezene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4,(3,4-dicarboxyphenoxy)diphenyl-2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphyenyl ether, 1,5-diaminonaphthalene, 3,3'-dimenthylbenzidine, 3,3'-dimethoxybenzidine, 2,4-bis($\beta$-amino-t-butyl)toluene, bis(p-$\beta$-amino-t-butylphenyl)ether, bis(p-$\beta$-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylendediamine, 1,4-cyclohexanediamine, 1,12-octadecanediamine, bis(3-aminopropyl)sulfide, N-methyl-bis(3-aminopropyl)amine, hexamethylenediame, heptamethylenediamine, nonamethylenediamine, decamethylenediamine, bis(3-aminopropyl)tetramethyldisiloxane, bis(4-aminobutyl)tetramethyldisiloxane, etc.

In general, the reactions can be advantageously carried out employing well-known solvents, e.g., o- dichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity $[\eta]$ greater than 0.2 deciliters per gram, preferably 0.35 to 0.60, or 0.7 deciliters per gram or even higher when measured in m-cresol at 25° C.

Included among the many methods of making the polyetherimides are those disclosed in Heath et al., U.S. Pat. No. 3,847,867, Williams U.S. Pat. No. 3,847,869, Takekoshi et al. U.S. Pat. No. 3,850,885, White U.S. Pat. Nos. 3,852,242 and 3,855,178, etc. These disclosures are incorporated herein in their entirety by reference for the purpose of teaching, by way of illustration, general and specific methods for preparing polyetherimides suitable for the blends of this invention.

Suitable methods for preparing polyphenylene ethers are disclosed in U.S. Pat. Nos. 3,306,874 and 3,306,875 to Hay and U.S. Pat. Nos. 3,257,357 and 3,257,358 to Stamatoff, incorporated herein by reference in their entirety. One method for preparing polyphenylene ethers comprises oxidizing a substituted phenol of the formula:

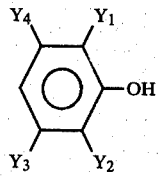

where $Y_1$ through $Y_4$ have has the meanings set forth previously. Oxidation of the phenol can be accomplished by passing an oxygen containing gas through the phenol while in the presence of a catalyst such as a cuprous salt and a tertiary amine.

In accordance with the present invention, blends of a polyetherimide and a polyphenylene ether are generally obtainable in all proportions of the two polymers relative to each other. Consequently, blends comprising from about 1 to about 99%, by weight, polyetherimide and from about 99 to about 1%, by weight polyphenylene ether are included within the scope of the invention. Preferably, the blends of the present invention contain from about 5% to about 95%, by weight, polyetherimide and from about 95% to about 5%, by weight, polyphenylene ether. By controlling the proportions of the polyetherimide and polyphenylene ether relative to each other, blends having certain predetermined properties which are improved over those of either a polyetherimide or a polyphenylene ether component alone are readily obtained.

It is contemplated that the polyetherimide-polyphenylene ether blends of the present invention may also include additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more polyphenylene ethers or two or more polyphenylene ethers in combination with one or more polyetherimides.

Methods for forming polyetherimide-polyphenylene ethers blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The polyetherimide-polyphenylene ether blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the recent invention can be used in automobile and aviation applications for decorative and protective purposes, and as high temperature electrical insulation for motor slot liners, transformers, dielectric capacitors, coil and cable wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimide-polyphenylene ether blends can also serve in printed circuit applications.

Alternatively, solutions of the blends herein described can be coated on electrical conductors such as copper, aluminum, and the like and thereafter the coated conductor can be heated at elevated temperatures to remove the solvent and provide a continuous resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention preferably by incorporating such fillers as asbestos, glass fibers, talc, quartz, powder, finely divided carbon, silica, and the like into the blends prior to molding. Shaped articles may be formed under heat, or under heat and pressure, in accordance with practices well-known in the art.

The following examples illustrate specific polyetherimide-polyphenylene ether blends in accordance with the present invention. It should be understood that the examples are given for the purpose of illustration and do not limit the invention. In the examples, all parts and percentages are by weight unless otherwise specified.

EXAMPLE I

Cast and compressed films of polyetherimide-polyphenylene ether blends according to the invention were prepared and the films then examined for compatability.

The polyetherimide of the blend was prepared from the reaction product of essentially equimolar amounts of 2,2-bis[4-(3,4-dicarboxy phenoxy)phenyl]propane dianhydride and m-phenylene diamine and the polyphenylene ether was poly(2,6-diphenyl-1,4-phenylene)ether. A blend of about 9 parts of polyetherimide to one part of polyphenylene ether was assessed for compatiability by (a) combining 10% chloroform solutions of each polymer to detect cloudiness which can be indicative of incompatibility, (b) compression molding a dried coprecipitated polymer mixture so as to determine homogeneity in the pressed sample, and (c) solution casting a polymer mixture onto a plate and drying to produce a film so as to determine homogeneity.

Specifically, solutions of each component of the blend were prepared by dissolving about 10% by weight of the polymer in about 90% by weight of chloroform. The contained polymer blend was then precipitated by the addition of methanol and the resultant precipitate dried under vacuum at about 80° C. A portion of the dried blend was redissolved in chloroform and the resultant solution cast on a glass plate. The chloroform was allowed to evaporate slowly at 25° C., leaving a film that was dried under vacuum at about 80° C., until a constant film weight resulted to thereby produce a film of about one to five mils in thickness. The remainder of the dried blend was compression molded between aluminum plates for about five minutes at about 5000 psi and at about 270°–315° C. A summary of the assessments of the blend is set forth in the following Table I.

EXAMPLE II

The procedure of Example I was repeated with the exception that about one part of the polyetherimide to about one part of polyphenylene ether were used to produce the blend according to the invention. Observations of the blend after combination in chloroform, compression molding and solution casting are set forth in the following Table I. A differential scanning calorimetry (DSC) measurement on the compression molded sample showed a valve for the glass transition temperature (Tg) of 205° C. Only one transition was detected.

EXAMPLE III

The procedure of Example I was repeated with the exception that about one part polyetherimide to about nine parts of polyphenylene ether were used to produce the blend according to the invention. Observations of the blend after combination in chloroform, compression molding and solution casting are set forth in the following Table I.

TABLE I

| | | | Poly(2,6-diphenyl-1,4 phenylene)ether Blends | | |
| | | | | Appearance | |
| Example | Weight Ratio PEI:PPE* | Pressing Temp. | Pressed Film | Cast Film | Chloroform Solution |
|---|---|---|---|---|---|
| I | 9:1 | | | Clear-flexible | Clear |
| II | 1:1 | 270,315 | Hazy-nonuniform-brittle | Clear-flexible | Slightly hazy |
| III | 1:9 | | | Clear-flexible | Slightly hazy |

*polyetherimide to polyphenylene ether

EXAMPLE IV

The procedure of Example II was repeated with the exception that poly(2-methyl-6-phenyl-1,4 phenylene)ether was used instead of poly(2,6-diphenyl-1,4-phenylene)ether. Observations of the blend after combination in chloroform, compression molding and solution casting are set forth in the following Table II.

EXAMPLE V

The procedure of Example IV was repeated with the exception that about three parts polyetherimide to about nine parts of polyphenylene ether were used to produce the blend according to the invention. Observations of the blend after combination in chloroform, compression molding and solution casting are set forth in the following Table II. A DSC measurement showed two Tg values (168° and 210° C.).

EXAMPLE VI

The procedure of Example IV was repeated with the exception that about nine parts polyetherimide to about one part of polyphenylene ether were used to produce the blend according to the invention. Observations of the blend after combination in chloroform, compression molding and solution casting are set forth in the following Table II.

TABLE II

| | | Poly(Phenylene)Ether Blends | | | |
| | | | | Appearance | |
| Example | Weight Ratio PEI:PPE* | Pressing Temp. | Pressed Film | Cast Film | Chloroform Solution |
|---|---|---|---|---|---|
| IV | 1:1 | 275 | Translucent-brittle | Almost clear-flexible | Clear |
| V | 1:3 | 275 | Hazy-brittle | | Clear- |
| VI | 1:9 | 275 | Almost clear-brittle | | Clear |

*polyetherimide to polyphenylene ether

EXAMPLE VII

The procedure of Example II was repeated with the exception that poly(2,6-dimethyl-1,4 phenylene)ether was used instead of poly(2,6-diphenyl-1,4-phenylene)ether. Observations of the blend after combination in chloroform, compression molding and solution casting are set forth in the following Table III.

EXAMPLE VIII

The procedure of Example VII was repeated with the exception that about one part polyetherimide to about three parts of polyphenylene ether were used to produce the blend according to the invention. Observations of the blend after combination in chloroform, compression molding and solution casting are set forth in the following Table III.

EXAMPLE IX

The procedure of Example VII was repeated with the exception that about one part polyetherimide to about nine parts of polyphenylene ether were used to produce the blend according to the invention. Observations of the blend after combination in chloroform, compression molding and solution casting are set forth in the following Table III.

TABLE III

Poly(2,6-dimethyl-1,4-phenylene)ether blends

| Example | Weight Ratio PEI:PPE* | Pressing Temp. | Appearance Pressed Film | Cast Film | Chloroform Solution |
|---|---|---|---|---|---|
| VII | 1:1 | 290 | Almost opaque-brittle | Hazy-flexible | Clear |
| VIII | 1:3 | 275 | Translucent, flexible | | Clear |
| IX | 1:9 | 275 | Almost clear, flexible | | Clear |

*polyetherimide to polyphenylene ether

From the above results, several observations concerning the blends according to the invention can be made. Although poly(2,6-diphenyl-1,4-phenylene)ether does not form a homogeneous blend with the polyetherimide when compression molded since crystallization is very rapid at the pressing temperatures and a non-uniform product results, if solutions of a mixture of amorphous and polyetherimide are used to cast films on glass plates, the films are found to be transparent over a wide range of compositions. Consequently, the polymers appear to be compatible in all propertions when amorphous.

With a blend containing poly(2-methyl-6-phenyl-1,4-phenylene)ether, some haziness is noted unless the ratio of polyetherimide to poly(2-methyl-6-phenyl-1,4-phenylene)ether is low. Since poly(2-methyl-6-phenyl-1,4-phenylene)ether does not crystallize, the haziness indicates some incompatibility at the 1:1 ratio, but less at other ratios. A blend containing poly(2,6-dimethyl-1,4-phenylene oxide), shows somewhat limited compatibility even at low polyetherimide ratios. In general, the compatibility of the polyphenylene ethers to polyetherimide seems to be lessened as the quantity of aliphatic groups in the polymer increases.

Substitution of other polyetherimides and/or other polyphenylene ethers for the polyetherimide and/or polyphenylene ether blends of the above examples, also any result in the formulation of polyetherimide polymer blends having similar characteristics.

While the present invention has been described with reference to particular embodiments thereof, it will be understood that numerous modifications may be made by those skilled in the art without actually departing from the spirit and scope of the invention as defined in the appended claims.

We claim:

1. A composition comprising a blend of (a) a polyphenylene ether and (b) polyetherimide wherein the polyphenylene ether consists essentially of the structural formula:

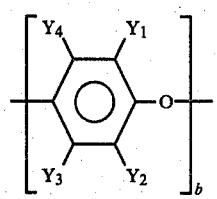

wherein the oxygen ether atom of one structural unit is connected to the benzene nucleus of the next adjoining unit, b is a positive integer and is at least 50 and $Y_1$, $Y_2$, $Y_3$ and $Y_4$, which may be the same or different, are nonvalent substituents selected from the group consisting of hydrogen, halogen, hydrocarbon radicals, halohydrocarbon radicals having at least two carbon atoms between the halogen atom and the benzene nucleus, hydrocarboxy radicals and halohydrocarboxy radicals having at least two carbon atoms between the halogen atom and the benzene nucleus.

2. A composition in accordance with claim 1 wherein $Y_1$ is methyl, $Y_2$ is phenyl and $Y_3$ and $Y_4$ are hydrogen.

3. A composition in accordance with claim 1 wherein $Y_1$ and $Y_2$ are methyl and $Y_3$ and $Y_4$ are hydrogen.

4. A composition in accordance with claim 1 wherein $Y_1$ and $Y_2$ are phenyl and $Y_3$ and $Y_4$ are hydrogen.

5. A composition in accordance with claim 1, 2, 3 or 4 wherein the polyetherimide has the formula;

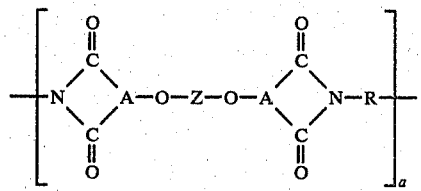

where a represents a whole number in excess of 1, the group —O—A< is selected from:

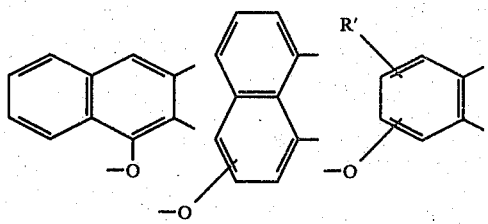

R' being hydrogen, lower alkyl or lower alkoxy, Z is a member of the class consisting of (1)

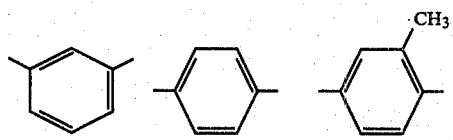

-continued

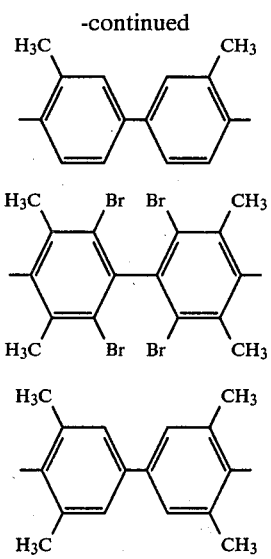

and (2) divalent organic radicals of the general formula:

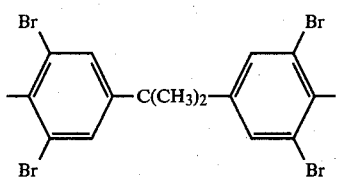

where X is a member selected from the class consisting of divalent radicals of the formulas, $$-C_yH_{2y}-, \quad -\overset{O}{\underset{}{C}}-, \quad -\overset{O}{\underset{O}{S}}-, \quad -O- \text{ and } -S-$$

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

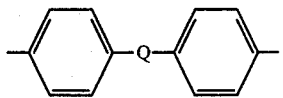

where Q is a member selected from the class consisting of $$-O-, \quad -\overset{O}{\underset{}{C}}-, \quad -\overset{O}{\underset{O}{S}}-, \quad -S- \text{ and } -C_xH_{2x}-$$

where x is a whole number from 1 to 5 inclusive.

6. A composition in accordance with claim 5 wherein the polyetherimide is of the formula;

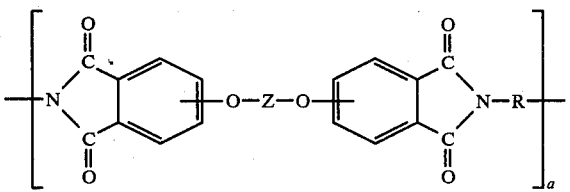

and the divalent bonds of O—Z—O radical are in the 3,3'; 3,4'; 4,3' or the 4,4' position.

7. A composition in accordance with claim 6 wherein Z is;

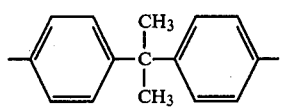

and R is selected from;

8. A composition in accordance with claim 7 wherein the polyetherimide is of the formula:

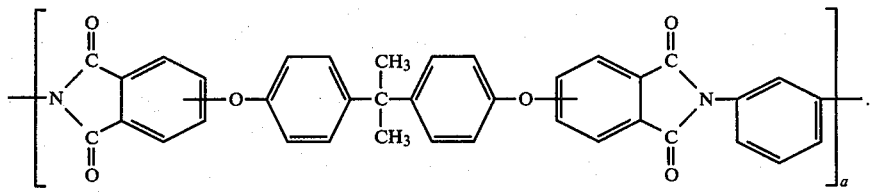

UNITED STATES PATENT AND TRADEMARK OFFICE
CERTIFICATE OF CORRECTION

PATENT NO. : 4,431,779
DATED : February 14, 1984
INVENTOR(S) : Dwain M. White et al.

It is certified that error appears in the above-identified patent and that said Letters Patent is hereby corrected as shown below:

Column 10, line 20, "$Y_{2Y}$" should read --$Y_2$--.

Column 10, line 22, "nonovalent" should read --monovalent--.

Signed and Sealed this

Thirtieth Day of October 1984

[SEAL]

Attest:

GERALD J. MOSSINGHOFF

*Attesting Officer*   *Commissioner of Patents and Trademarks*

UNITED STATES PATENT AND TRADEMARK OFFICE
CERTIFICATE OF CORRECTION

PATENT NO. : 4,431,779
DATED : February 14, 1984
INVENTOR(S) : Dwain M. White et al.

It is certified that error appears in the above-identified patent and that said Letters Patent is hereby corrected as shown below:

Column 3, line 51, "carbons" should read --carbon--.

Column 10, line 20, "$Y_2Y$" should read --$Y_2$--.

Column 10, line 22, "nonovalent" should read --monovalent--.

Signed and Sealed this

Fifth Day of February 1985

[SEAL]

Attest:

DONALD J. QUIGG

Attesting Officer        Acting Commissioner of Patents and Trademarks